US008630197B2

(12) United States Patent
Chu et al.

(10) Patent No.: US 8,630,197 B2
(45) Date of Patent: Jan. 14, 2014

(54) METHOD FOR DETERMINING DATA RATE AND PACKET LENGTH IN MOBILE WIRELESS NETWORKS

(75) Inventors: Yuechun Chu, Winter Springs, FL (US); John M. Belcea, W. Melbourne, FL (US); Avinash Joshi, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 449 days.

(21) Appl. No.: 12/888,742

(22) Filed: Sep. 23, 2010

(65) Prior Publication Data

US 2012/0076010 A1    Mar. 29, 2012

(51) Int. Cl.
*G01R 31/08*    (2006.01)
(52) U.S. Cl.
USPC ........................................... 370/252
(58) Field of Classification Search
USPC ......... 370/252, 310, 338, 349, 465–468, 470, 370/471
See application file for complete search history.

(56) References Cited

U.S. PATENT DOCUMENTS

| | | | |
|---|---|---|---|
| 6,064,678 A * | 5/2000 | Sindhushayana et al. .... | 370/470 |
| 6,567,375 B2 | 5/2003 | Balachandran et al. | |
| 6,898,198 B1 | 5/2005 | Ryan et al. | |
| 7,039,038 B2 | 5/2006 | Shoemake | |
| 7,339,892 B1 | 3/2008 | Engwer et al. | |
| 2003/0081628 A1* | 5/2003 | Sugar et al. .................... | 370/461 |
| 2003/0133427 A1* | 7/2003 | Cimini et al. .................. | 370/338 |
| 2005/0286440 A1* | 12/2005 | Strutt et al. .................... | 370/253 |

FOREIGN PATENT DOCUMENTS

WO    2006024994 A1    3/2006

OTHER PUBLICATIONS

Daji Qiao et al., Goodput Analysis and Link Adaptation for IEEE 802.11a Wireless LANs, IEEE Transaction on mobile computing, vol. 1, No. 4, Oct. 2002.*
Qiao D. and Choi, S., "Goodput enhancement of IEEE 802.11a wireless LAN via link adaptation," IEEE International Conference on Communications, Jun. 2001, pp. 1995-2000.
Kim, B., et al., "Throughput enhancement through dynamic fragmentation in wireless LANs," IEEE Transactions on Vehicular Technology, Jul. 2005, vol. 54, No. 4, pp. 1415-1425.
Modiano, E., "An adaptive algorithm for optimizing the packet size used in wireless ARQ protocols," Wireless Networks, 1999, vol. 5, pp. 279-286.
Chang, Y., "Dynamic optimal fragmentation with rate adaptation in wireless mobile networks," Doctoral Dissertation, Georgia Institute of Technology, Dec. 2007.

(Continued)

*Primary Examiner* — Jeffrey M Rutkowski
*Assistant Examiner* — Peter Mak
(74) *Attorney, Agent, or Firm* — Steven A. May; Randi L. Karpinia

(57) ABSTRACT

A method is provided to determine optimal data rate and packet length in mobile networks. The method directly determines the optimal packet length (L) and data rate (D), which allows fast convergence in the mobile channel. The method automatically identifies and quantifies channel conditions, as well as adjusts parameters according to changes of channel conditions. A variable (Channel condition Index (CCI)) is abstracted from simulations and then used to describe and quantify the impact of three components of channel conditions: signal-to-noise ratio (SNR), multipath environment and velocity. Based on packet completion rate (PCR) status, the channel condition is identified in terms of CCI value. Once CCI is identified, the model of effective throughput G is directly optimized to locate the best packet length (L) and data rate (D).

16 Claims, 7 Drawing Sheets

(56) References Cited

OTHER PUBLICATIONS

Minn, H., et al., "A reduced complexity channel estimation for OFDM systems with transmit diversity in mobile wireless channels," IEEE Transactions on Communications, May 2002, vol. 50, No. 5, pp. 799-807.

Tourrilhes, J., "Fragment Adaptive Reduction: Coping with Various Interferers in Radio Unlicensed Bands," IEEE International Conference on Communications, Jun. 2001, pp. 239-244.

Jardosh, A., et al., "Understanding Congestion in IEEE 802.11b Wireless Networks," Internet Measurement Conference, Oct. 19-21, 2005.

Recommendation ITU-R M.1225, "Guidelines for Evaluation of Radio Transmission Technologies for IMT 2000," IMT-2000, 1997.

Sadowsky J. and Li Q., "Packet Error Probability Prediction for 802.11 MAC Simulation," IEEE 11-03/0863r0, Intel, Nov. 2003.

* cited by examiner

PACKET LENGTH (NUMBER OF SYMBOLS)

| CHANNEL CONDITIONS | 10 | 20 | 30 | 40 | 50 | 60 | 70 | 80 | 90 | 100 |
|---|---|---|---|---|---|---|---|---|---|---|
| A | 0 | 0.0148 | 0.0119 | 0.0086 | 0.0066 | 0.0079 | 0.0058 | 0.0034 | 0.0032 | 0.0026 |
| B | 0.0076 | 0.2266 | 0.2833 | 0.3154 | 0.3226 | 0.3194 | 0.312 | 0.2799 | 0.2501 | 0.2162 |
| C | 0.0228 | 0.5201 | 0.7099 | 0.8395 | 0.9104 | 0.913 | 0.8782 | 0.8239 | 0.7417 | 0.6433 |
| D | 0.0326 | 0.7168 | 0.9965 | 1.176 | 1.2658 | 1.2654 | 1.2184 | 1.1164 | 1.0119 | 0.908 |
| E | 0.0354 | 0.8041 | 1.121 | 1.3226 | 1.4274 | 1.4305 | 1.3471 | 1.2484 | 1.1343 | 1.0167 |
| F | 0.0369 | 0.8228 | 1.1614 | 1.3687 | 1.474 | 1.4839 | 1.3901 | 1.2896 | 1.1662 | 1.0429 |
| G | 0.0372 | 0.8263 | 1.1711 | 1.3882 | 1.4932 | 1.5016 | 1.4016 | 1.3031 | 1.1779 | 1.0495 |
| H | 0.0377 | 0.8269 | 1.1731 | 1.392 | 1.491 | 1.5025 | 1.4016 | 1.3039 | 1.1779 | 1.0521 |
| I | 0 | 0.2233 | 0.2609 | 0.2644 | 0.2331 | 0.1915 | 0.1448 | 0.1118 | 0.0809 | 0.0655 |
| J | 0.0018 | 0.5097 | 0.6493 | 0.6744 | 0.6124 | 0.5184 | 0.4164 | 0.3169 | 0.249 | 0.1874 |
| K | 0.003 | 0.7007 | 0.892 | 0.9185 | 0.8188 | 0.7034 | 0.5644 | 0.4346 | 0.3437 | 0.2817 |
| L | 0.0035 | 0.7853 | 0.9929 | 1.0209 | 0.9032 | 0.7745 | 0.6284 | 0.4716 | 0.3894 | 0.3118 |
| M | 0.0038 | 0.8091 | 1.025 | 1.0543 | 0.9378 | 0.7824 | 0.6483 | 0.4893 | 0.3969 | 0.3092 |
| N | 0.0035 | 0.8139 | 1.0342 | 1.0668 | 0.946 | 0.7945 | 0.6547 | 0.4968 | 0.4075 | 0.3118 |
| O | 0.0033 | 0.8152 | 1.0379 | 1.0707 | 0.947 | 0.7959 | 0.6553 | 0.4968 | 0.4033 | 0.3092 |

FIG. 4

| CHANNEL CONDITION INDEX | 10 | 20 | 30 | 40 | 50 | 60 | 70 | 80 | 90 | 100 |
|---|---|---|---|---|---|---|---|---|---|---|
| -0.103655 | 0 | 0.0148 | 0.0119 | 0.0086 | 0.0066 | 0.0079 | 0.0058 | 0.0034 | 0.0032 | 0.0026 |
| 0.837867 | 0.0076 | 0.2266 | 0.2833 | 0.3154 | 0.3226 | 0.3194 | 0.312 | 0.2799 | 0.2501 | 0.2162 |
| -0.910530 | 0.0228 | 0.5201 | 0.7099 | 0.8395 | 0.9104 | 0.913 | 0.8782 | 0.8239 | 0.7417 | 0.6433 |
| -0.919581 | 0.0326 | 0.7168 | 0.9965 | 1.176 | 1.2658 | 1.2654 | 1.2184 | 1.1164 | 1.0119 | 0.908 |
| -0.922143 | 0.0354 | 0.8041 | 1.121 | 1.3226 | 1.4274 | 1.4305 | 1.3471 | 1.2484 | 1.1343 | 1.0167 |
| -1.164508 | 0.0369 | 0.8228 | 1.1614 | 1.3687 | 1.474 | 1.4839 | 1.3901 | 1.2896 | 1.1662 | 1.0429 |
| -1.164348 | 0.0372 | 0.8263 | 1.1711 | 1.3882 | 1.4932 | 1.5016 | 1.4016 | 1.3031 | 1.1779 | 1.0495 |
| -0.923024 | 0.0377 | 0.8269 | 1.1731 | 1.392 | 1.491 | 1.5025 | 1.4016 | 1.3039 | 1.1779 | 1.0521 |
| 0.763414 | 0 | 0.2233 | 0.2609 | 0.2644 | 0.2331 | 0.1915 | 0.1448 | 0.1118 | 0.0809 | 0.0655 |
| 0.919830 | 0.0018 | 0.5097 | 0.6493 | 0.6744 | 0.6124 | 0.5184 | 0.4164 | 0.3169 | 0.249 | 0.1874 |
| 0.970682 | 0.003 | 0.7007 | 0.892 | 0.9185 | 0.8188 | 0.7034 | 0.5644 | 0.4346 | 0.3437 | 0.2817 |
| 0.991200 | 0.0035 | 0.7853 | 0.9929 | 1.0209 | 0.9032 | 0.7745 | 0.6284 | 0.4716 | 0.3894 | 0.3118 |
| 0.997800 | 0.0038 | 0.8091 | 1.025 | 1.0543 | 0.9378 | 0.7824 | 0.6483 | 0.4893 | 0.3969 | 0.3092 |
| 1.000103 | 0.0035 | 0.8139 | 1.0342 | 1.0668 | 0.946 | 0.7945 | 0.6547 | 0.4968 | 0.4075 | 0.3118 |
| 1.000573 | 0.0033 | 0.8152 | 1.0379 | 1.0707 | 0.947 | 0.7959 | 0.6553 | 0.4968 | 0.4033 | 0.3092 |

PACKET LENGTH (NUMBER OF SYMBOLS)

*FIG. 5*

|  | 6 Mbps | 9 Mbps | 12 Mbps | 18 Mbps | 24 Mbps | 36 Mbps | 48 Mbps | 54 Mbps |
|---|---|---|---|---|---|---|---|---|
| $P_0$ | 0.000397 | 0.000271 | 0.000098 | 0.020424 | -0.024629 | -0.056829 | -0.066566 | -0.061910 |
| $P_1$ | -0.006491 | -0.006783 | -0.008981 | -0.324916 | 0.166360 | 0.532045 | 0.757005 | 0.717005 |
| $P_2$ | 0.006017 | 0.005301 | 0.005295 | 0.433197 | 0.929416 | 0.392599 | -0.948684 | -1.002531 |
| $P_3$ | -0.002531 | -0.002335 | -0.000383 | -0.195687 | -0.574724 | -0.424290 | 0.332561 | 0.383171 |
| $P_4$ | 4.465255 | 4.465257 | 4.465252 | 4.504604 | 0.059154 | 0.058058 | 0.059060 | 0.050897 |
| $P_5$ | 2.791316 | 2.791315 | 2.791314 | 2.792406 | -1.792774 | -1.790760 | -1.783329 | -1.792461 |
| $P_6$ | -0.198382 | -0.198382 | -0.198383 | -0.196903 | 0.823881 | 0.821473 | 0.808329 | 0.807449 |
| $P_7$ | -44.818039 | -44.591511 | -36.918327 | -0.476975 | 0.120917 | 0.201023 | 0.110316 | 0.216744 |
| $P_8$ | 1.290439 | 2.202848 | 9.406974 | 0.718245 | -7.012967 | -8.063825 | -8.014250 | -9.457580 |
| $P_9$ | 6.751216 | 6.266952 | 7.799489 | 0.898669 | 21.023350 | 25.662898 | 27.092572 | 33.506019 |

*FIG. 6*

METHOD FOR DETERMINING DATA RATE AND PACKET LENGTH IN MOBILE WIRELESS NETWORKS

FIELD OF THE DISCLOSURE

The present disclosure relates generally to wireless networks and more particularly to determining data rate and packet length in mobile wireless networks.

BACKGROUND

Wireless communication networks, such as mobile wireless telephone networks, have become increasingly prevalent over the past decade. The wireless telephone networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed and deployed. In this type of network, each mobile node is capable of operating as a base station or router for the other mobile nodes, thus eliminating the need for a fixed infrastructure of base stations.

More sophisticated ad-hoc networks are also being developed and deployed, which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet.

Because the propagation conditions in mobile networks are time-varying and error-prone, it is challenging to sustain a high system performance in these networks. Therefore, it is desirable to deploy mechanisms that adapt the characteristics of the wireless system to the dynamic changes of the propagation channel based on certain measurements.

In Media Access Control (MAC) layer, three factors play critical roles in adapting the communication to the characteristics of the mobile channel: transmit power, data rate and the transmission duration of a data packet. In relation with the other two elements, the transmit power has a very slow variation and it is considered constant for the time when the teaching of this invention applies. Data rate is characterized as bits per second and is determined by the modulation and coding complexity. The duration of a data packet transmission is the result of the current data rate and the amount of data in a packet.

Accordingly, there is a need for a method and apparatus for determining data rate and packet length in mobile wireless networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a table illustrating an example of values of effective throughput (G) for different channel conditions and packet lengths for an 802.11a system as determined through simulation.

FIG. 5 is a table of the channel condition index (CCI) for the channel conditions listed in the table of FIG. 4.

FIG. 6 is a table illustrating the values of a constant $p_0$-$p_9$ parameter for various data rates of 802.11a.

Figure 1:
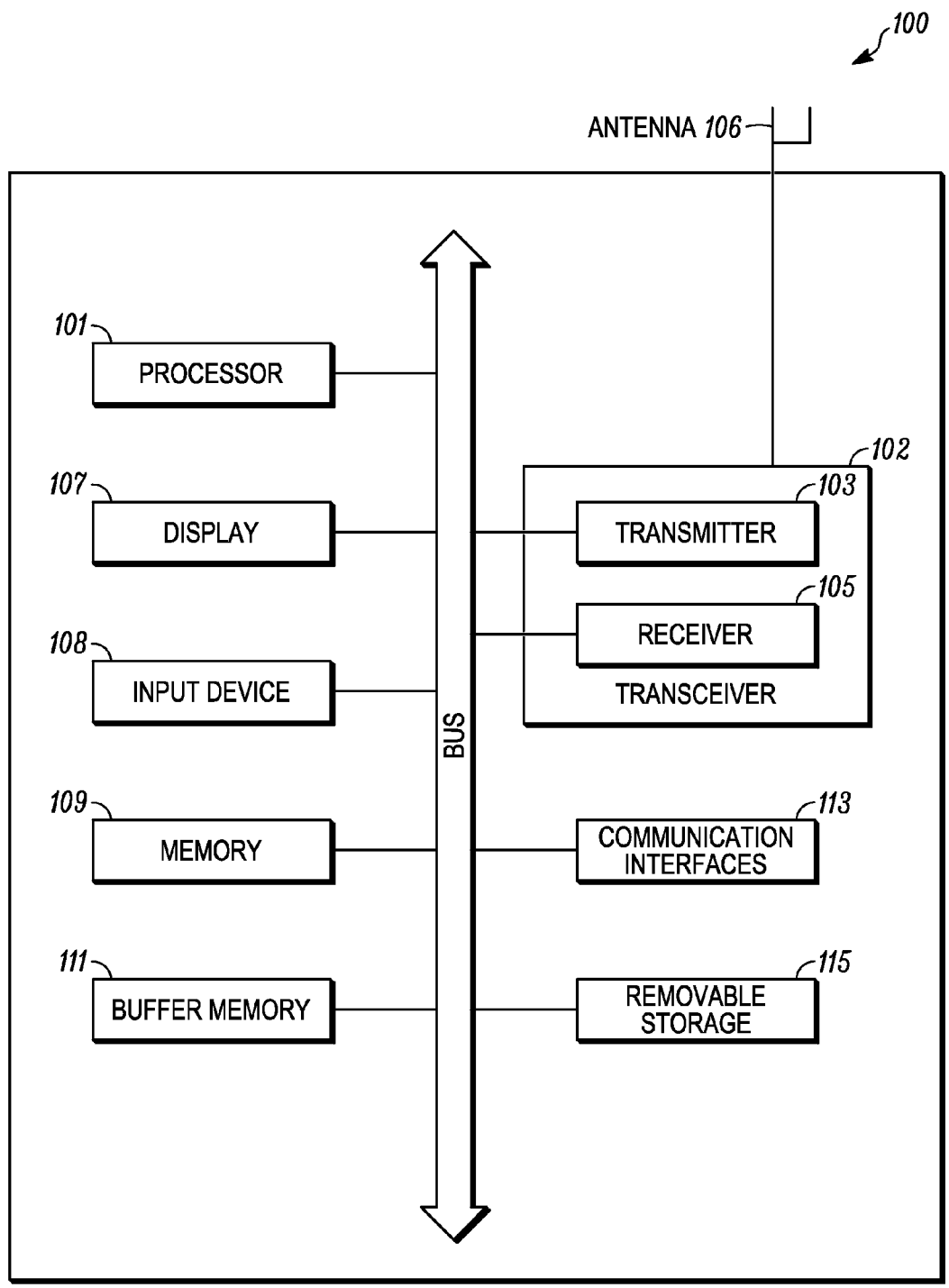
FIG. 1 is a block diagram of a wireless communication device operable in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method is described herein to determine optimal data rate and packet length in mobile networks. Unlike the adaptive, trial based or other suboptimal algorithms, this method directly determines the optimal packet length (L) and data rate (D), which allows fast convergence in the mobile channel. The method automatically identifies and quantifies channel conditions, as well as adjusts parameters according to changes of channel conditions.

In the method provided herein, an abstract variable (Channel condition Index (CCI)) is abstracted from simulations and this variable is then used to describe and quantify the impact of three components of channel conditions: signal-to-noise ratio (SNR), multipath environment and velocity. Based on packet completion rate (PCR) status, the channel condition is identified in terms of CCI value. Once CCI is identified, the model of effective throughput G is directly optimized to locate the best packet length (L) and data rate (D). Although the method involves extensive simulation, variable extraction, and modeling, such computation is done beforehand. Once the models and CCI values are decided, the computation in real-time is basically reduced to table lookup and comparisons.

Orthogonal frequency-division multiplexing (OFDM) is a frequency-division multiplexing (FDM) scheme utilized as a digital multi-carrier modulation method. A large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase-shift keying) at a low symbol rate, maintaining total data rates similar to conventional single-carrier modulation schemes in the same bandwidth.

OFDM has developed into a popular scheme for wideband digital communication, whether wireless or over copper wires, used in applications such as digital television and audio broadcasting, wireless networking and broadband internet access.

In some networks (such as those using OFDM), information is assembled into a number of symbols and each symbol is transmitted with fixed duration. Therefore, the number of symbols per packet can be used to quantify the packet transmission duration or the data packet length. The data packet length (or data packet transmission duration) is defined as the number of symbols used for coding one data packet. The number of symbols per data packet changes with the data rate that implies using various amount of energy per transmitted bit. For this reason various modulation methods and coding rates provide various levels of energy per bit that qualifies the robustness of communications. When the channel condition deteriorates, changes of data rate improve the efficiency of the communication. The length of a data packet is important for mobile communication because of the Doppler shift induced by velocity. When a mobile device or its surrounding objects move fast, the Doppler shift increases and channel coherence time (i.e. time interval over which the channel impulse responses are highly correlated) decreases. At a reduced channel coherence time, the channel can not sustain efficient communication using large packets.

Therefore, it is beneficial to use the correlation between data rate and packet length as the means of controlling and improving the communication efficiency. When a mobile channel deteriorates, a more robust data rate (i.e. often a lower data rate that provides higher energy per bit) would be chosen. However, with a lower data rate, more symbols are needed for carrying the same amount of information, which increases the length of the packet length. At high moving speed of objects, the very large data packet may take too long to be transmitted and the communication may not be sustainable by mobile channels, which in fact could result in poorer performance. Therefore, increasing the energy per bit through change of data rate with the intent of improving mobile network efficiency can in fact deteriorate it.

The method provided herein addresses several issues that seriously affect the network performance when the rate and packet length are used for controlling the communication efficiency. Firstly, with regards to the correlation between data rate and packet length: the determination of data rate and packet length is constructed as a two-dimensional problem. Thus, the correlation between rate and packet length is considered. Secondly, with regards to the environment factor: in addition to SNR, environment/channel models are used to describe the channel conditions. Thirdly, with regards to fast adaptation (real time): modeling techniques are applied to directly determine the best rate and packet length values, which then allows fast convergence to (sub) optimal solutions. Fourthly, with regards to fewer measurements: the described method requires as input only the packet completion rate (PCR). This measurement is easy to maintain and does not incur much overhead.

The described method is applicable to controlling in real time the operation of mobile wireless networks. The method quantifies the channel conditions and uses these conditions for identifying the data rate and the packet length that would provide the best performance of the network. The fast converging optimization is performed using pre-established models extracting from simulations and empirical data. The pre-established models allow determining data rate and packet length on real-time becomes a matching process which does not need any experimental adjustment and thus allows fast convergence.

Referring to the figures, FIG. 1 is a block diagram of a wireless communication device 100. The wireless communication device 100 comprises a processor 101, a transceiver 102 including a transmitter circuitry 103 and a receiver circuitry 105, an antenna 106, a display 107, an input device 108, a memory 109 for storing operating instructions that are executed by the processor 101, a buffer memory 111, one or more other communication interfaces 113 (i.e. Ethernet, serial ports, and the like), and optionally a removable storage unit 115. Although not shown, the wireless communication device 100 also can include an antenna switch, duplexer, circulator, or other highly isolative means (not shown) for intermittently providing information packets from the transmitter circuitry 103 to the antenna 106 and from the antenna 106 to the receiver circuitry 105. The wireless communication device 100 can be an integrated unit containing at least all the elements depicted in FIG. 1, as well as any other elements necessary for the wireless communication device 100 to perform its particular functions. Alternatively, the wireless communication device 100 may comprise a collection of appropriately interconnected units or devices, wherein such units or devices perform functions that are equivalent to the functions performed by the elements of the wireless communication device 100. For example, the wireless communication device 100 may comprise a laptop computer and a wireless LAN (local area network) card.

The processor 101 can include one or more microprocessors, microcontrollers, DSPs (digital signal processors), state machines, logic circuitry, or any other device or devices that process information based on operational or programming instructions. Such operational or programming instructions can be, for example, stored in the memory 109. As will be described in greater detail below, the processor 201 can include a performance optimization module 110 that is used to perform processing associated with optimal data rate and packet length determination methods that will be described below.

The memory 109 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing non-transitory digital information.

One of ordinary skill in the art will recognize that when the processor 101 has one or more of its functions performed by a state machine or logic circuitry, the memory 109 containing the corresponding operational instructions may be embedded within the state machine or logic circuitry.

The transmitter circuitry 103 and the receiver circuitry 105 enable the wireless communication device 100 to communicate information packets to and acquire information packets from the other nodes. In this regard, the transmitter circuitry 103 and the receiver circuitry 105 include conventional circuitry to enable digital or analog transmissions over a wireless communication channel. The transmitter circuitry 103 and the receiver circuitry 105 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, IEEE 802.11 wireless local area network (WLAN) interfaces, IEEE 802.16 interfaces, Worldwide Interoperability for Microwave Access (WiMax) interfaces, and the like).

The implementations of the transmitter circuitry 103 and the receiver circuitry 105 depend on the implementation of the wireless communication device 160. For example, the transmitter circuitry 103 and the receiver circuitry 105 can be implemented as an appropriate wireless modem, or as conventional transmitting and receiving components of two-way wireless communication devices. In the event that the transmitter circuitry 103 and the receiver circuitry 105 are implemented as a wireless modem, the modem can be internal to the wireless communication device 100 or insertable into the wireless communication device 100 (e.g., embodied in a wireless radio frequency (RF) modem implemented on a Personal Computer Memory Card International Association (PCMCIA) card). For a wireless communication device, the transmitter circuitry 103 and the receiver circuitry 105 can be implemented as part of the wireless device hardware and software architecture in accordance with known techniques. Most, if not all, of the functions of the transmitter circuitry 103 and/or the receiver circuitry 105 may be implemented in a processor or processors, such as the processor 101. However, the processor 101, the transmitter circuitry 103, and the receiver circuitry 105 have been artificially partitioned herein to facilitate a better understanding.

The receiver circuitry 105 is capable of receiving radio frequency (RF) signals from multiple bandwidths. The receiver circuitry 105 may optionally comprise a first receiver and a second receiver, or one receiver capable of receiving in two or more bandwidths. The transceiver 102 includes at least one set of transmitter circuitry 103. The transmitter circuitry 103 may be capable of transmitting to multiple devices on multiple frequency bands. As with the receiver circuitry 105, dual transmitters 103 may optionally be employed where one transmitter is for the transmission to a proximate node or direct link establishment to WLANs and the other transmitter is for transmission to a cellular base station, for example.

The antenna 106 comprises any known or developed structure for radiating and receiving electromagnetic energy in the frequency range containing the wireless carrier frequencies.

The buffer memory 111 may be any form of volatile memory, such as RAM, and is used for temporarily storing received information packets.

Determining Data Rate and Packet Length

Target Function

The objective of adjusting data rate and packet length is to obtain the best network performance as throughput and delay and the like under the current propagation circumstance. The target function, effective throughput (G) can be expressed as following:

$$G = \frac{L \cdot N}{T_d + T_q + T_{w0}} = L \cdot N \Big/ \left(\frac{t_{sd}pcr_c + t_{sc} + t_e}{pcr_d pcr_c}\right) = \frac{L \cdot N \cdot pcr_d pcr_c}{t_{sd}pcr_c + t_{sc} + t_e}$$

Where, L is the packet length in OFDM symbols and N is the number of bytes per symbol; Td is the average transmission time of a packet; Tq is the queuing delay and $T_{w0}$ is the average waiting time due to the medium contention; and $PCR_d$ and $PCR_c$ are the packet completion rate for data packets and control packets (e.g. request to send (RTS) and clear to send (CTS)) respectively; $T_{sd}$ and $T_{sc}$ are the transmission time for data and control packets respectively; $T_e$ is a constant which summarizes the processing delay. The value of N is decided by code rate or data rate, depending on used modulation.

By ignoring all the control message loss caused by transmission failures, the G can be further derived as:

$$G = \frac{L \cdot N \cdot pcr}{t_{sd} + t_{sc} + t_e} \qquad \text{Equation 1}$$

Since N is determined by the data rate (i.e. D), the effective throughput G becomes a function of L, D and PCR. Packet completion rate (PCR) depends on channel condition (in terms of SNR and environment), choice of data rate D and packet length L (number of symbols). For a given channel condition, G becomes a function of L and D. So it is possible to construct an optimization model targeting the effective throughput G as function of L and D. By solving this optimization problem, one can obtain the values of L and D maximizing the value of effective throughput G. Although the optimization itself seems straightforward, it is difficult to achieve the prerequisite of the problem—channel condition (in terms of signal to noise ration (SNR) and environment). SNR is not only hard to measure (most 802.11 chip sets do not provide SNR value) but also it is a parameter measured at the receiving side. The transmitter side can find out the value of the SNR at reception side only through a special control message the receiving side uses as feedback. Even more complicated than SNR, the environment that a wireless network operates on is almost impossible to measure. In the next section channel condition issues will be addressed.

Channel Condition Estimation

Channel Condition

To characterize a channel, at least three factors should be considered: SNR, multipath and relative velocity.

The SNR is often used as an indicator of channel condition. Since SNR means comparing the level of the received signal with the background noise, SNR is just an indicator of the signal strength.

Figure 2:
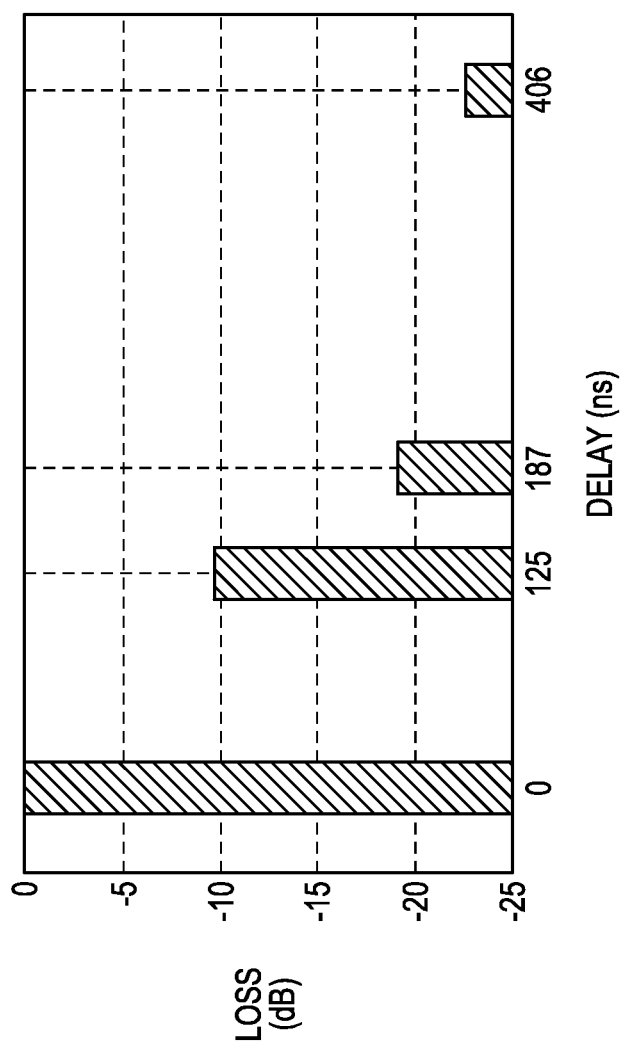
FIG. 2 illustrates a model describing a mild multipath environment.
Figure 3:
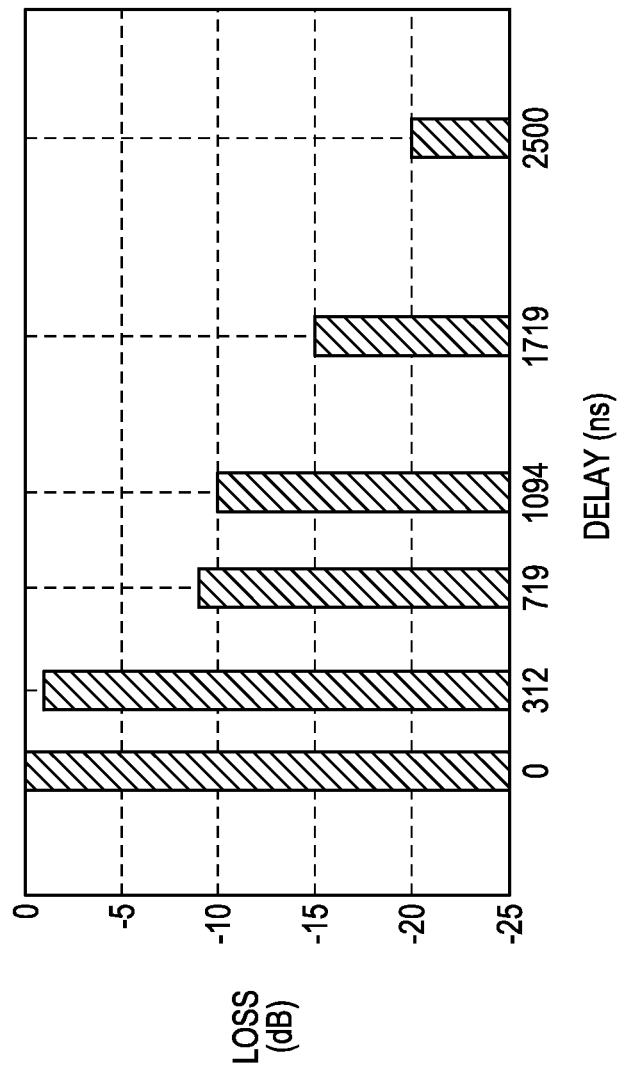
FIG. 3 illustrates a model describing a severe multipath environment.

Besides SNR, the propagation environment is characterized by the multipath delay profile. While using a wireless device, one can observe that the same SNR, which generates good throughput in rural environment, results in poor performance in a complex environment such as city highway. The difference of performance is due to the fact that in different environments the multipath components and their variation regarding time are different. When the significant part of a received signal is made of multipath components, the performance suffers. FIGS. 2 and 3 illustrate two delay profile models describing two different environments. Specifically, the channel model in FIG. 2 describes a mild multipath environment (e.g. International Telecommunication Union (ITU) pedestrian model); while the model in FIG. 3 describes a severe multipath environment (e.g. ITU vehicular model).

Velocity

In a mobile channel, relative velocity can have a critical impact on performance. The Doppler shift induced by the velocity penalizes large packet lengths. The Doppler shift induced by speed reduces the channel coherence time. The coherence time $T_c$ can be estimated by (for time correlation coefficient of 0.5):

$$T_c = \frac{9}{16\pi f_m} \qquad \text{Equation 2}$$

Where, $f_m$ is the Doppler shift and is given by $f_m = v/\lambda$, were v is the velocity and $\lambda$ is the wavelength. The higher the velocity is; the smaller is the coherence time. Since the transmission duration of a packet should be less than the channel coherence time, large packet length would hardly survive the channel with small channel coherence time.

Measurement of Channel Condition

Although the three mentioned components of channel condition seem tangible, it is challenging to measure each of them. SNR is measured at the receiving side. Even if the receiver can measure the SNR, the only way that transmitter side would get it is through a report message, which adds significant overhead to the network. Generating a delay profile of the multipath environment is also a complex process. Usually a site survey using special equipment such as sounding machine is conducted. The survey results are processed using statistical methods to generate the delay profile of the target environment. Hence, when a wireless mobile device is communicating, it is impossible to directly detect the delay profile in real time. The velocity is usually measurable. However, it is hard for a wireless device to detect relative speed unless some special protocols and equipment like global positioning system (GPS) technology is deployed. Even if a wireless device could detect its own speed, the velocity in Equation 2 is the relative velocity of an object towards its surrounding. So it should account for the velocity of the wireless device's surrounding objects, which is extremely difficult to measure. Due to the challenges of directly measuring these channel condition components, the current method utilizes channel condition estimations based on simulation.

Channel Condition Index
Simulation

Based on the recognition of the three dominant factors of channel condition, different channels can be simulated by varying the values of SNR, multipath profiles and velocity. With 802.11X physical layer models (e.g. 802.11a/g, 802.11b, and 802.11n), performance can be generated in terms of PCR and bit error rate (BER) for various channel conditions. FIG. 4 is a table illustrating an example of performance obtained through simulation. Specifically, FIG. 4 illustrates values of effective throughput (G) for different channel conditions and packet lengths for an 802.11a system where D=24 mega bits per second (Mbps). For simplicity and illustration purposes, only the results for some of the channel conditions and packet length from ten (10) to ninety (90) symbols are shown. The simulation utilizes 802.11 as a physical layer model.

The data packets are passed through the physical layer transmitter, channel (which is set up based on SNR, multipath delay profile and velocity), and then the receiver. After the receiving process, the PCR value can be computed. By bringing PCR into Equation 1, we can retrieve the G values as shown in FIG. 4. Note that the first column is the list of channels. They are set up by varying SNR, velocity and multipath delay profiles. For example, Channel A is generated by setting SNR to five (5) decibels (dB), velocity to forty (40) miles per hour (mph), and using the mild multipath profile.

From FIG. 4, G is illustrated as a function of packet length L and channel condition. However, since the channel condition is set up by varying SNR, multipath delay profile and velocity and the impact of these factors are not quantifiable, it is not clear how to quantify the channel condition and use it as a variable. To resolve this issue, a reverse modeling method is applied to retrieve the channel condition variable.

Modeling and Channel Condition Index (CCI)

First, we completely ignore the origin and physical meaning of each row in FIG. 4. By examining FIG. 4, we can see G is a function of packet length L and some other variable, which we name $\beta$ for now. Therefore: $G=g(\beta,L)$. Assuming $G=g(\beta,L)$ can be expressed as the following empirical rational expression $$G = g(\beta, L) = \frac{p_0 + 0.1 p_1 L + 0.01 p_2 L^2 + 0.0001 p_3 L^4}{1 + p_4\beta + p_5\beta^2 + p_6\beta^4} * \frac{1}{1 + p_7\beta + 0.1 p_8 L + 0.01 p_9 L^2} \qquad \text{Equation 3}$$

Given Equation 3 and values of G and L (examples shown in FIG. 4), we can obtain the values of constant $p_0$-$p_9$ by applying curve fitting techniques. Note that all the variables in Equation 3 (i.e. ($\beta$, L and G) are continuous variables.

Thus far the relationship between G and $\beta$, L has been determined Since G should be a function of L and channel condition, it can be concluded that $\beta$ should be closely related to the channel condition. Therefore, $\beta$ can be renamed as the channel condition index (CCI). By using $\beta$ to describe the channel condition, the channel condition can be quantified and made into a continuous variable (since $\beta$ is a continuous variable). Now each channel condition listed in FIG. 4 can be assigned a CCI value (CCI values can be found using the curve fitting techniques similar to the ones determining the constant $p_0$-$p_9$ of g( )).

FIG. 5 shows a table of the CCI for the channel conditions listed in the table of FIG. 4.

Note that G is also related to data rate. Because the data rate has only discrete values, it is not proper to directly model the relationship between G and D. So for each data rate, a series of simulations are performed to generate the results similar to those shown in FIG. 4. Then a model like Equation 3 is determined for this data rate. Hence G should be ex-pressed as $G=g_D(CCI, L)$, meaning for each data rate a function of g(•) is generated. Assuming the function for each data rate has the form of Equation 3, we can obtain unique sets of $p_0$-$p_9$ for each data rate.

FIG. 6 shows the values of $p_0$-$p_9$ parameter for all the data rates of 802.11a.

Numerical Values of Parameters

The form of the empirical Equation 3 has been identified by several attempts for matching the measured values as close as possible.

The values of CCI and p0 to p9 parameters were computed using a curve fitting method. The values of these parameters are selected with the intent of providing the smaller standard deviation of the difference between the values computed with Equation 3 and the values measured during the simulation.

From the curve fitting point of view, the function that provides the best fitting of the experimental data has a very large number of local optima. Great care has been takes for preventing that the denominators of rational functions have no roots within the operating domain. It means that the empirical functions presented here and the values of parameters, which provide a good approximation of the simulated reality, are not unique. Other empirical functions and/or different values of parameters may provide approximation of the simulated phenomenon with similar precision.

Algorithm for Packet Length and Data Rate Adjustment Algorithm

Once we solve the issue of quantifying channel condition, the rest of packet length and rate control procedure becomes straightforward. The input of the algorithm is the PCR. As we mentioned above, the PCR is collected based on packet transmission status, which is relatively easy to obtain. Based on the PCR status, the method and algorithm for packet length and data rate control is illustrated in FIG. 7 and described herein below.

Figure 7:
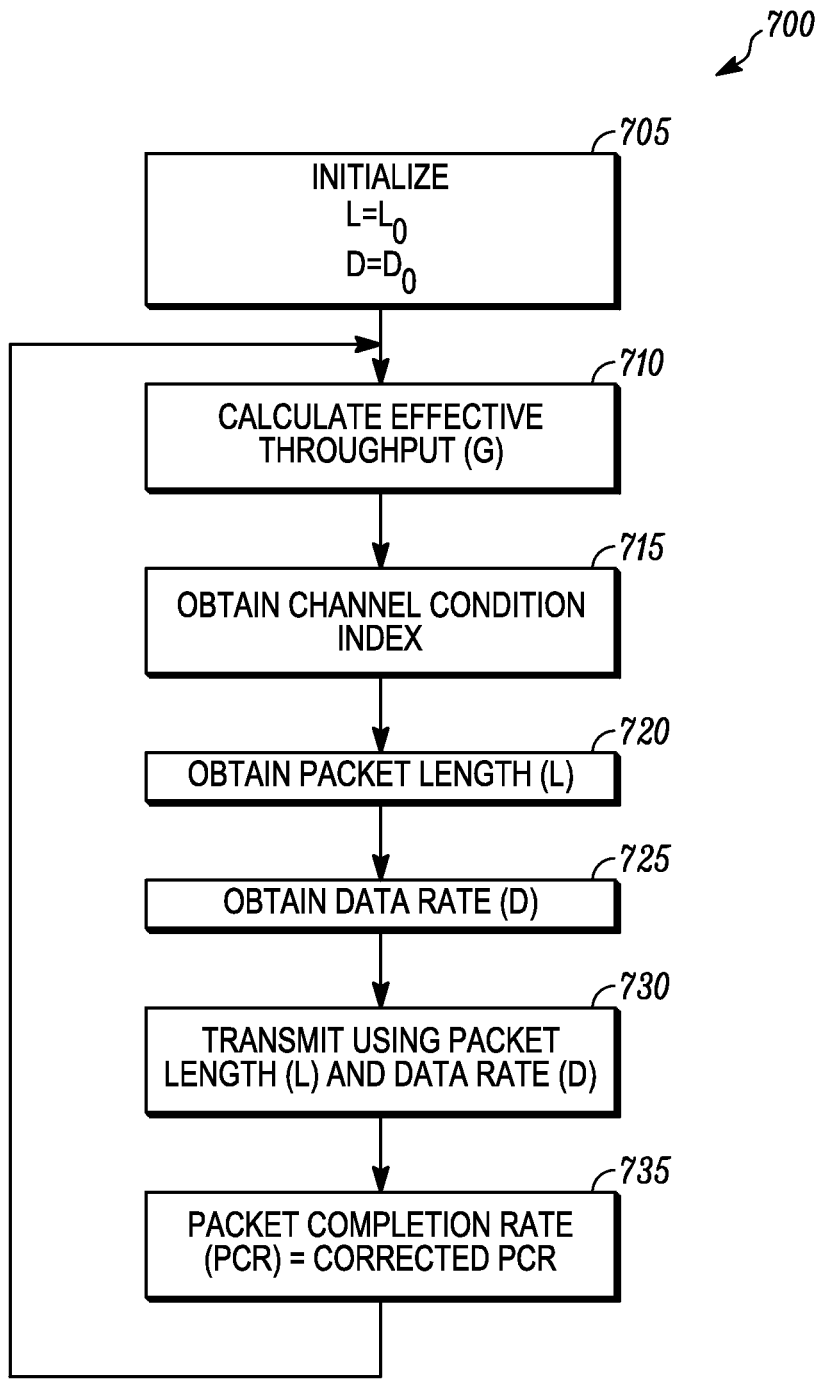
FIG. 7 is a flowchart illustrating a method for packet length and data rate control in accordance with some embodiments.

As illustrated in FIG. 7, the packet length and data rate control method 700 begins with an initial operation 705 including defining the starting values of packet length and data rate ($L_0$ and $D_0$). In other words, the packet length ($L=L_0$) and data rate ($D=D_0$) are each initialized. Next, in operation 710, the value of effective throughput (G) is obtained based on a measured value of packet completion rate (PCR) using Equation 1.

Next, in operation 715, the Channel Condition Index (CCI) is obtained. In one embodiment, CCI is calculated. To calculate CCI, according to the current data rate (D), choose the function (see Equation 3) and find the value of CCI for which the function has the closest value to G computed in operation 710. In an alternate embodiment, a table of G(CCI, L) can be set up for each data rate. In this case, obtaining the value of CCI is a matter of table lookup.

Next, in operation 720, the packet length (L) is obtained. In one embodiment, the packet length (L) is calculated. To calculate packet length (L), using the Channel Condition Index (CCI) value found in operation 715 and $g_D$, find the value of L for which:

$$\frac{\partial g_D(L)}{\partial L} = 0.$$

where:

$g_D$ is an expression of effective throughput for a data rate (D), and $\partial$ is the partial derivative function.

In an alternate embodiment, the solutions of the equation for all $g_D$(CCI,L) functions (for each data rate) are pre-computed and stored in memory in sorted tables. These solutions provide the values of L for which the function has the maximum value.

Next, in operation 725, the data rate (D) is obtained. To obtain D, with the known value of packet length L (number of symbols) and the average number of bytes per transmitted packet, the new data rate D is selected from the list of available data and coding rates.

Next, in operation 730, the newly identified packet length L and data rate D values are used in next transmission.

Next, in operation 735, the current PCR value is set equal to a corrected PCR value obtained from the packet transmission. The operation then cycles back to operation 710.

The method and algorithm described hereinbefore is designed for adjusting packet length and data rate in mobile channel in real-time. It uses PCR as input of the algorithm and does not require complex physical layer measurement. Unlike the adaptive or trial based algorithms, this algorithm directly determines the L and D providing the best effective throughput, which translates into fast convergence of the mobile channel. Because we have defined CCI to describe the channel condition, the proposed algorithm is able to automatically identify and quantify the channel condition, as well as to adjust the parameters according to the channel continuously changing conditions, which is critical in the mobile environment.

Considerations

Number of Data Rates

Because the data rate is discrete, the proposed method generates a function for every data rate. When determining data rate and packet length, the proposed method needs to compare the G of all the data rates. Therefore, if the number of data rates is large, such process could be computationally expensive. However, 802.11b and 802.11a/g have small number of data rates (802.11b and 802.11a/g have 3 and 8 data rates respectively). Although 802.11n has 16 data rates (i.e. MCS0~MCS15), each of the lower MCS's (i.e. MCS0~MCS7) has the same modulation and code rates as its counterparts of higher MCS's (i.e. MCS8~MCS15). The only difference between lower and higher MCS' lies in the number of streams. The lower MCS's use one stream and the higher MCS's use two streams. Hence, we suggest mapping higher MCS's to lower MCS's and only modeling 8 lower MCS data rates.

Simulations

The CCI is not a measurable parameter but an abstract variable extracted from simulation results. We extract the CCI to quantify the compound impact of SNR, multipath environment and velocity on communication efficiency. Hence, the proposed method requires serious simulation effort. To some extend the proposed method use simulation-generated data and modeling to exchange the fast determination and adaptation in the mobile environment. So this method is only suitable for the networks and channel models that can be simulated. If a wireless device experiences a channel that can not be described by any of the delay profiles we have simulated, the accuracy of the method will be degraded. However, after years of effort on channel modeling, most of environment has been measured and described by delay profiles. Usually it is not a major concern.

Accuracy of PCR

A PCR can be obtained for every packet (e.g. if the transmission succeeds on first try, PCR=100%. If the transmission succeeds on second retry, PCR=50%, etc.). The PCR can also be averaged over n packets (n>1). The accuracy of PCR does not necessary improve with the value of n, because larger number of measurements can be collected only over longer time intervals, during which the channel conditions may change. Using an Infinite Input Filter (IIF) for smoothing the variations of PCR makes the algorithm able to quickly adapt to condition changes. Eventual inaccuracies of PCR are randomly distributed and are not accumulative. This could only induce oscillations of the parameter adjustments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining a data rate and a packet length for a data transmission in a wireless communication network, the method comprising:
    operating a wireless communication device within the wireless communication network to:
        initialize a starting value for a packet length and a data rate;
        determine an effective throughput (G) based on a measured value of a packet completion rate (PCR);
        determine a channel condition index based on the determined effective throughput;
        adjust the packet length based on the determined channel condition index;
        adjust the data rate based on the determined packet length; and
        transmit at least one data transmission using the adjusted packet length and the adjusted data rate; and
    wherein determining the channel condition index further comprises:
        calculating the channel condition index based on the current data rate;
        identifying the effective throughput (G) as a function of packet length (L) and the channel condition index (CCI); and
        finding a value of the channel condition index for which the function has the closest value to the effective throughput (G).

2. The method of claim 1, wherein the wireless communication device utilizes modeling techniques to determine an optimal packet length and an optimal data rate for the adjusted packet length and the adjusted data rate.

3. The method of claim 1, wherein the operation of determining the effective throughput (G) based on a measured value of a packet completion rate (PCR) comprises calculating the effective throughput by:

$$G = \frac{L \cdot N \cdot pcr}{t_{sd} + t_{sc} + t_e}$$

where:
    L is a packet length in orthogonal frequency-division multiplexing (OFDM) symbols,
    N is a number of bytes per symbol, whose value is determined based on modulation.
    PCR is a packet completion rate,
    $T_{sd}$ is a transmission time for data packets,
    $T_{sc}$ is a transmission time for control packets, and
    $T_e$ is a constant which summarizes a processing delay.

4. The method of claim 1, wherein the channel condition index comprises an abstract variable which is an estimation based on one or more simulations.

5. The method of claim 4, wherein the channel condition index quantifies one or more channel conditions considering one or more of a signal-to-noise ratio (SNR), a multipath environment, and a velocity.

6. The method of claim 1, wherein the effective throughput function is expressed by an empirical rational expression of:

$$G = g(\beta, L) = \frac{p_0 + 0.1p_1L + 0.01p_2L^2 + 0.0001p_3L^4}{1 + p_4\beta + p_5\beta^2 + p_6\beta^4} * \frac{1}{1 + p_7\beta + 0.1p_8L + 0.01p_9L^2}$$

where:
$\beta$ is the channel condition index,
L is a packet length in orthogonal frequency-division multiplexing (OFDM) symbols, and
$p_0$ through $p_9$ are constants which are obtained by applying curve fitting techniques.

7. The method of claim 1, wherein the operation of determining the channel condition index comprises operating the wireless communication device to:
store, in a memory of the wireless communication device, a table of effective throughput as a function of channel condition index and packet length for each data rate; and
obtain the channel condition index through looking up in the table.

8. The method of claim 1, wherein the operation of adjusting the packet length (L) comprises operating the wireless communication device to:
calculate the packet length (L) using the obtained channel condition index and $g_D$ by finding the packet length value (L) for which:

$$\frac{\partial g_D(L)}{\partial L} = 0,$$

where:
$g_D$ is an expression of effective throughput for a data rate (D), and
$\partial$ is the partial derivative function.

9. The method of claim 1, wherein the operation of adjusting the packet length (L) comprises operating the wireless communication device to:
store, in a memory of the wireless communication device, a table of the values of the packet length (L) for which the function $$\frac{\partial g_D(L)}{\partial L} = 0$$

has a maximum value; and
obtain the value of packet length from the table.

10. The method of claim 1, wherein the operation of adjusting the data rate comprises operating the wireless communication device to:
identify an optimal packet length (L) for each data rate;
obtain the corresponding effective throughput $g_D$ value for each of the optimal packet lengths (L); and
select a date rate that corresponds with a maximum corresponding effective throughput $g_D$ value.

11. The method of claim 1, further comprising operating the wireless communication device to:
change a stored packet completion rate (PCR) value based on one or more PCR statistics obtained from a current packet transmission.

12. The method of claim 11, further comprising operating the wireless communication device to:
repeat the operations of determining the channel condition index; the adjusted packet length; and the adjusted data rate; and
transmit at least one data transmission using the adjusted packet length and the adjusted data rate.

13. A wireless communication device comprising:
a processor that is configured to:
initialize a starting value for a packet length and a data rate;
determine an effective throughput (G) based on a measured value of a packet completion rate (PCR);
determine a channel condition index based on the determined effective throughput;
adjust the packet length based on the determined channel condition index;
adjust the data rate based on the determined packet length;
transmit at least one data transmission using the adjusted packet length and the adjusted data rate; and
wherein the processor is configured to determine the channel condition index by:
calculating the channel condition index based on the current data rate;
identifying the effective throughput (G) as a function of packet length (L) and the channel condition index (CCI); and
finding a value of the channel condition index for which the function has the closest value to the effective throughput (G).

14. The wireless communication device of claim 13, wherein the processor is configured to adjust the data rate by:
identifying an optimal packet length (L) for each data rate;
obtaining the corresponding effective throughput $g_D$ value for each of the optimal packet lengths (L); and
selecting a date rate that corresponds with a maximum corresponding effective throughput $g_D$ value.

15. The wireless communication device of claim 13, further comprising a memory that stores a table of effective throughput as a function of channel condition index and packet length for each data rate and wherein the processor is configured to obtain the channel condition index through looking up in the table.

16. A method for determining a data rate and a packet length for a data transmission in a wireless communication network, the method comprising:
operating a wireless communication device within the wireless communication network to:
initialize a starting value for a packet length and a data rate;
determine an effective throughput (G) based on a measured value of a packet completion rate (PCR);
determine a channel condition index based on the determined effective throughput;
adjust the packet length based on the determined channel condition index;
adjust the data rate based on the determined packet length;
transmit at least one data transmission using the adjusted packet length and the adjusted data rate; and wherein determining the channel condition index comprises:
  storing, in a memory of the wireless communication device, a table of effective throughput as a function of channel condition index and packet length for each data rate; and
  using the table to determine the channel condition index.

* * * * *